March 11, 1958  C. T. GAYLEY  2,826,671
METHOD OF WELDING
Filed May 7, 1956
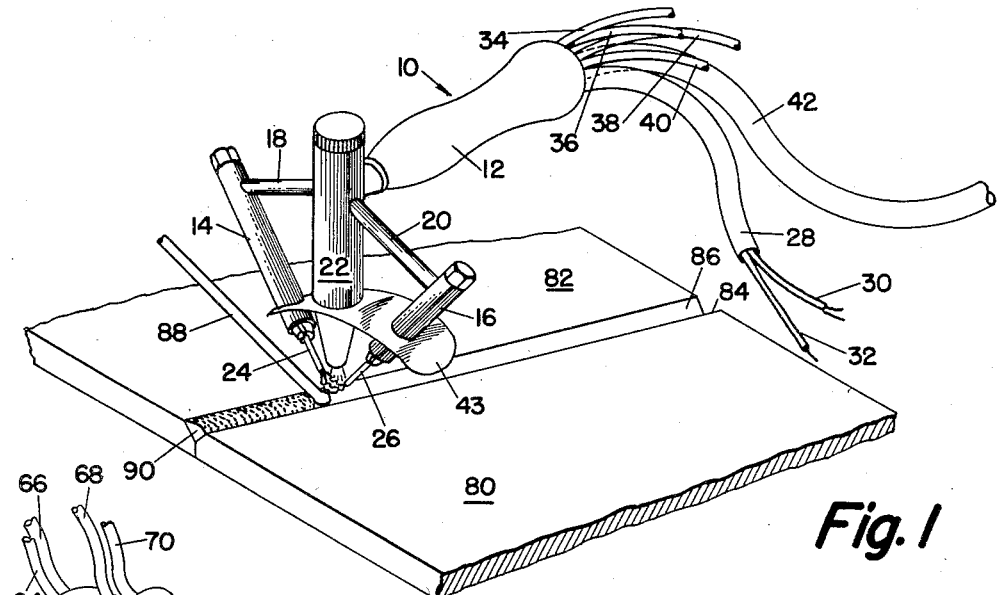
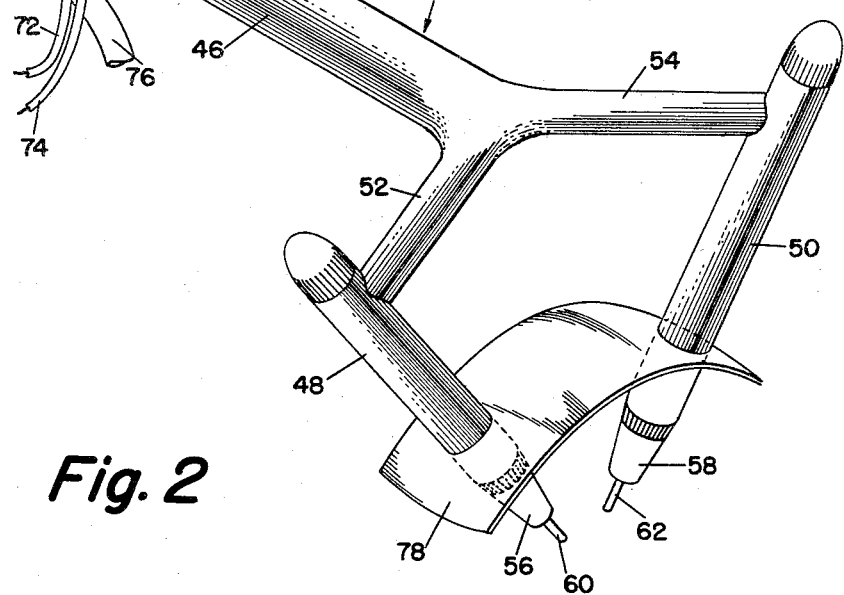
Fig. 1
Fig. 2
INVENTOR.
CHARLES T. GAYLEY
BY
Edward W Hughes
ATTORNEYS

United States Patent Office 2,826,671
Patented Mar. 11, 1958

2,826,671
METHOD OF WELDING

Charles T. Gayley, Lansdowne, Pa., assignor to the United States of America as represented by the Secretary of the Navy Application May 7, 1956, Serial No. 583,335

2 Claims. (Cl. 219—75)

(Granted under Title 35, U. S. Code (1952), sec. 266)

The invention described herein may be manufactured and used by or for the Government of the United States of America for governmental purposes without the payment of any rolayties thereon or therefor.

This invention relates to methods and apparatus for welding metals in which the dilution of the weld metal by the base metals is minimized, and particularly to provide methods and apparatus for welding titanium and its alloys to ferrous metals.

Previous attempts to weld titanium or titanium alloys to other metals failed to produce satisfactory welds because of the considerable dilution of the weld metal with titanium. The dissolved titanium in the weld metal forms brittle phase alloys whenever a relatively small percentage of titanium is present. For example, if one wishes to weld titanium to iron, using nickel as the filler metal, the alloy of nickel, iron and titanium becomes brittle when the amount of titanium in the alloy is equal to or greater than 10% by weight. Previously known methods of welding titanium to iron have been unsuccessful in limiting the dilution of the weld metal by the base metals to 10% or less.

Electric arc welding in which the base is one electrode has proven unsatisfactory for welding titanium to dissimilar metals because the amount of heat transferred to the base metals and the weld metal is not controllable. This causes an excess amount of the base metals to be melted. Further, the large electric currents flowing through the molten weld metal causes physical mixing which increases the dilution of the weld metal by the base metals.

Oxyacetylene welding of titanium to other metals is unsatisfactory because it is impossible to shield the molten titanium from oxygen, nitrogen and the combustion products. These gases when combined with titanium produce an unsatisfactory weld as is well known in the art. Induction methods of welding have also proven unsatisfactory because the amount of heat and the consequent melting of the base metals is not easily controlled. Further the electrical currents produced in the base and weld metals cause extensive physical mixing between the weld metals and the base metals.

It is, therefore, an object of this invention to provide improved process and apparatus whereby the dilution of the weld metal by the base metals can be minimized.

It is a further object of this invention to provide method and apparatus for welding titanium to dissimilar metals without the weld metal entering into the brittle phase because of the presence of too great a percentage of titanium.

It is a still further object of this invention to provide method and apparatus for welding titanium, or titanium alloys, to ferrous metals in which the filler metal is selected from the group of columbium, vanadium, tantalum, molybdenum, and nickel.

Other objects and advantages of the invention will hereinafter become more fully apparent from the following description of the annexed drawings, which illustrate a preferred embodiment, and wherein:

Fig. 1 is a perspective view of one form of the apparatus for practicing the invention; and Fig. 2 is a perspective view of a second form of the apparatus for practicing the invention.

Referring to Fig. 1, welding torch 10 is provided with a hollow handle 12 to which electrode holders 14, 16 are secured by hollow tubular members 18, 20. A gas nozzle 22 is also secured to handle 12. Electrodes 24, 26, which are made from a refractory material such as tungsten, are adjustably mounted in electrode holders 14, 16. The details of construction of electrode holders 14, 16 and nozzle 22 are conventional and well known in the art; and, therefore, they are not illustrated in detail.

In a preferred form of construction, electrode holders 14, 16 are mounted with respect to each other so that their longitudinal axes determine an angle of substantially 60°. Nozzle 22 is mounted so that its longitudinal axis lies in the plane determined by the longitudinal axes of holders 14, 16 and so that its longitudinal axis bisects the angle determined by the longitudinal axes of holders 14, 16. Handle 12 is mounted so that its longitudinal axis determines an angle of approximately 60° with the longitudinal axis of nozzle 22.

Electrical cable 28, which extends into hollow handle 12, is provided with two insulated electrical conductors 30, 32, one of which conductors is connected to electrode 24, and the other of which is connected to electrode 26. In order to prevent electrodes 24, 26 and electrode holders 14, 16 from becoming excessively hot, they may be water cooled. Inlet hoses 34, 36 and outlet hoses 38, 40 provide separate cooling facilities for the two electrode holders 14, 16 as is well known in the art. Two separate cooling circuits are provided to reduce the possibility of an electrical short between electrodes 24, 26 through the coolant. Any suitable inert shielding gas such as helium, argon, or a mixture of the two is supplied under pressure to the nozzle 22 by shield gas hose 42 from a source which is not illustrated. Torch 10 is illustrated as being provided with a reflecting shield 43 which is connected to electrode holders 14, 16. The inner surface of shield 43 is shaped to focus electro-magnetic radiation from the electric arc between tips of electrodes 24, 26 onto the base metals when the torch is held at a normal distance from such base metals.

In Fig. 2 a second modification of the apparatus for practicing the invention is illustrated. Welding torch 44 is provided with a hollow handle 46 to which electrode holders 48, 50 are secured by hollow tubular members 52, 54. Electrode holders 48, 50 are mounted with respect to each other and with respect to handle 44 in the same manner that electrode holders 14, 16 and handle 12 of torch 10 are mounted with respect to each other. Electrode holders 48, 50 differ from electrode holders 14, 16 of torch 10 in that holders 48, 50 are each provided with a gas nozzle 56, 58 through which the inert shielding gas flows. Tungsten electrodes 60, 62 are adjustably mounted in holder 48, 50. Electrode holders 48, 50 and electrodes 60, 62 are water cooled by water circulating through the electrode holders. The details of construction of electrode holders 48, 50 are also conventional and well known in the art; therefore, they are not illustrated in detail.

The water inlet hoses 64, 66 convey the cooling water through handle 46 and tube members 52, 54 to the electrode holders 48, 50. The heated water is carried away from the electrode holders by water outlet hoses 68, 70. Insulated electrical conductors 72, 74 are connected respectively to electrode 60 and electrode 62.

Shielding gas is carried to torch 44 by gas hose 76. Torch 44 may also be provided with a reflecting shield 78, which shield is secured to electrode holders 48, 50. Shield 78 is shaped to focus radiant energy from the arc between electrodes 60, 62 onto the base metals to be welded.

When torch 10, for example, is used to weld a sheet of titanium 80 to a sheet of iron 82, conductors 30, 32 are connected to a suitable source of electric power which is not illustrated. A. C. or D. C. or a combination of these two types of electric power may be used. Gas hose 42 is connected to a suitable source of shielding gas. The inlet water hoses are connected to a source of water, and the outlet water hoses are connected to any suitable device for disposing of the heated water. The base metals 80, 82 are insulated from the electrical circuits of torch 10 and preferably also from ground. This tends to prevent the arc between electrodes 24, 26 from shorting through the base metals 80, 82. After an arc is established between electrodes 24, 26, the shielding gas, which is formed into a stream by nozzle 22, flows around the electric arc and is heated thereby. The principal means of transferring heat to the work; i. e., scarfs 84, 86 of base metals 80, 82, welding rod or filler metal 88, and weld metal 90 is the heat from the electric arc conducted by the shielding gas. However, a considerable quantity of heat energy is also transferred to the work by electromagnetic radiation from the arc. The presence of reflector 43 increases the amount of radiant energy incident on the base metals 80, 82 and the weld metal 90, since it focuses an additional portion of the radiant energy on the work which would otherwise not serve any useful purpose.

The intensity of the heat and the rate at which the heat is transferred to the base metals 80, 82, the weld metal 90 and filler metal 88, depends, other factors remaining constant, upon the distance torch 10 is held from the base metals 80, 82. Thus the heating of the base metals, the filler metal, and weld metal can be accurately and readily controlled by the welder using torch 10 by varying the distance of the arc between electrodes 24, 26 and the work. As a result, only the very surface of the scarfs, 84, 86 of base metals 80, 82 need be melted or fused. Also, since there are no electric currents present in weld metal 90, there is substantially no physical mixing of the melted metals. Because the amount of base metal that is melted is relatively small, and since there is substantially no physical mixing of the melted weld metal, it is possible to minimize the amount of base metals contained in the weld metal.

Filler metals selected from the group of columbium, vanadium, tantalum, molybdenum and nickel form non-brittle alloys with ferrous alloys and titanium when the percentage of titanium in the weld metal is below a given percentage by weight, which percentage is approximately 35% for columbium, 15% for vanadium, 20% for tantalum, 10% for molybdenum, and 10% for nickel. By using the welding torches illustrated in Figs. 1 and 2, which permit the amount of melting of the base metals to be minimized and reduces the dilution of the weld metals by the base metals, strong non-brittle welds of titanium to iron with a filler metal selected from the group of columbium, vanadium, tantalum, molybdenum and nickel can be readily made.

It is, of course, possible to use the welding torches illustrated in Figs. 1 and 2 to clad the scarf 84 of the titanium 80 with a thin layer of one of the filler metals selected from the group of columbium, vanadium, tantalum, molybdenum and nickel; and to similarly clad the scarf 86 of the iron sheet 82 with the same, or different, filler metals selected from this group; and to then weld the claded surfaces as is well known in the art.

In welding torch 44, two gas nozzles 56, 58 are provided instead of the single nozzle 22 with which torch 10 is provided. The shielding gases, which are formed into streams by nozzles 56, 58, flow parallel to the longitudinal axes of electrodes 60, 62 until they meet. The point at which the two streams of inert gases merge is approximately the location of the molten weld metal when the torch is in use.

In operation, torch 44 is used in the same manner, and has substantially the same welding characteristics as torch 10. There is a slight increase in the amount of heat transferred to the shielding gases in torch 44 because the shielding gases flow over the electrode holder and the electrode, as well as around the arc.

Obviously many modifications and variations of the present invention are possible in the light of the above teachings. It is therefore to be understood that within the scope of the appended claims the invention may be practiced otherwise than as specifically described.

What is claimed is:

1. A welding torch comprising a hollow tubular handle for receiving insulated electrical conductors and inert shielding gas and water coolant tubes which are used in a welding process, a hollow tubular arm extending outwardly from each of opposed sides of said handle and a hollow electrode holder depending from each tubular arm, each arm and electrode holder receiving portions of said conductors and said tubes, said electrode holders being arranged with their lower ends converging at an angle of substantially 60° toward each other and each having an electrode in its lower end connected to a conductor, said electrodes being closely spaced to provide for formation of an arc between their tip ends and said angle of disposition of the holders preventing the formed arc from moving upwardly of the holders to thereby maintain the arc at the tip ends of the electrodes.

2. A welding torch comprising a hollow tubular handle for receiving insulated electrical conductors and inert shielding gas and water coolant tubes which are used in a welding process, a hollow tubular arm extending outwardly from each of opposed sides of said handle and a hollow electrode holder depending from each tubular arm, each arm and electrode holder receiving portions of said conductors and said tubes, said electrode holders being arranged with their lower ends converging at an angle of substantially 60° toward each other and each having an electrode in its lower end connected to a conductor, said electrodes being closely spaced to provide for formation of an arc between their tip ends and said angle of disposition of the holders preventing the formed arc from moving upwardly of the holders to thereby maintain the arc at the tip ends of the electrodes, and a deflector secured between said electrode holders and directly above the electrodes for focusing radiant energy from the arc formed between the electrodes toward metals being welded.

References Cited in the file of this patent

UNITED STATES PATENTS

| | | |
|---|---|---|
| 641,767 | Drosse | Jan. 23, 1910 |
| 1,708,003 | Weinman | Apr. 9, 1929 |
| 1,834,991 | Alexander | Dec. 8, 1931 |
| 1,904,104 | Tobey et al. | Apr. 18, 1933 |
| 1,933,343 | Sandelowsky | Oct. 31, 1933 |
| 1,946,302 | Weller | Feb. 6, 1934 |
| 1,946,305 | Catlett | Feb. 6, 1934 |
| 2,342,086 | Meredith | Feb. 15, 1944 |
| 2,594,333 | Medicus | Apr. 29, 1952 |
| 2,646,492 | Ballard | July 21, 1953 |